Figure 1:
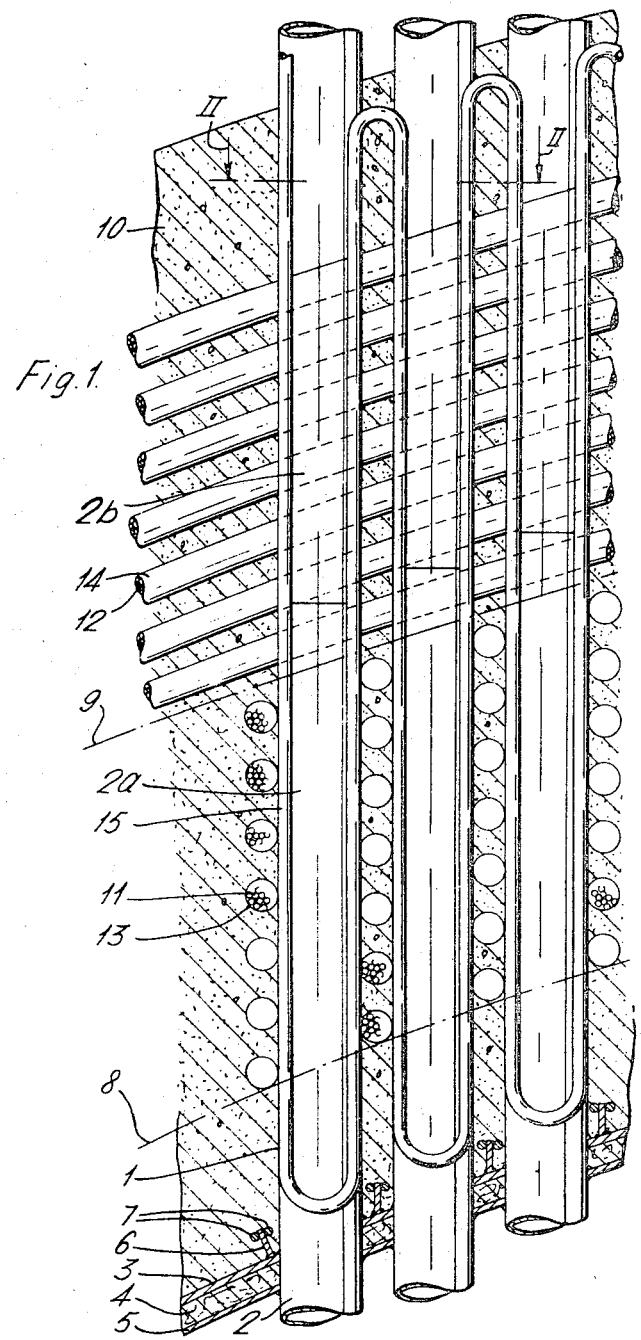

Aug. 27, 1968

C. MASSEY 3,398,493

CONCRETE PRESSURE VESSELS

Filed Feb. 3, 1964

4 Sheets-Sheet 1

Aug. 27, 1968  C. MASSEY  3,398,493
CONCRETE PRESSURE VESSELS
Filed Feb. 3, 1964  4 Sheets-Sheet 4

# United States Patent Office 3,398,493
Patented Aug. 27, 1968

3,398,493
CONCRETE PRESSURE VESSELS
Cecil Massey, Warrington, England, assignor to United Kingdom Atomic Energy Authority, London, England
Filed Feb. 3, 1964, Ser. No. 342,210
Claims priority, application Great Britain, Feb. 12, 1963, 5,646/63
3 Claims. (Cl. 52—230)

This invention relates to pre-stressed concrete pressure vessels and is primarily concerned with vessels for use in nuclear reactor installations. The term "pre-stressed concrete pressure vessel" is intended to mean a concrete vessel embraced or partly embraced by flexible cables which are tensioned to induce compressive stresses within the structure and thereby nullify or partially nullify tensile stresses induced by gas or liquid pressure within the vessel. The cables can be tensioned prior to subjecting the vessel to internal pressure and, optionally, may be further tensioned after pressurisation or be bonded to the structure.

Power producing nuclear reactor cores are usually housed within pressure vessels so that coolant gas can be pressurised to increase the thermal efficiency of the installation. Reactors have been provided with fabricated steel pressure vessels which, because of their relatively large proportions, required to be of large wall thickness of the order 2 to 4 inches. Such pressure vessels are difficult to fabricate and therefore are expensive and with the advent of gas-cooled reactors designed to operate at increased power and pressure, pre-stressed concrete pressure vessels have been developed. Examples of such pressure vessels are described in our copending application number 729,732, now Patent No. 3,292,317, and also in British Patent 861,513. Pressure vessel shells are pierced to provide access to fuel element and control rod channels in the core for charge and discharge of fuel elements and replacement of control rods respectively, and because of the relatively close pitching of the fuel element channels it is common to provide a single access to serve a group of channels. However, in such an arrangement fuel elements are required to be manipulated from a vertical lift to a non-vertical lift via charge chutes, which procedure, whilst reasonably feasible for charging and discharging single elements, offers considerable difficulty for charging and discharging strings of fuel elements. Accordingly, at the present time, there is preference for the provision of individual access apertures in the pressure vessel for each channel. In some designs of concrete pressure vessel having a charge panel penetrated by a plurality of charge tubes it is preferable to dispose the pre-stressing cables in a lattice-work arrangement with the charge tubes penetrating the lattice between parallel cables. Where the required degree of pre-stressing demands stacks of cables in the form of lattices and the lattice pitching of the fuel element channels and charge tubes is relatively small, with some arrangements of cables the pouring of concrete completely to fill the voids in and around the cables and charge tubes becomes difficult and it is impracticable to insert a consolidating tool therebetween. The problem is further aggravated by the provision of cooling means, such as water pipes, for the concrete in proximity to the charge tubes and as described in our copending application No. 329,557, now Patent No. 3,284,313.

An object of the present invention is to facilitate construction of pre-stressed concrete pressure vessels.

According to the invention a pre-stressed concrete pressure vessel, having a portion thereof penetrated by closely spaced parallel apertures arranged in lattice array and providing access to the interior of the vessel, comprises a plurality of lifts of concrete, stacks of spaced pre-stressing cables for each lift of concrete and disposed between adjacent rows of apertures, and the said stacks associated with adjacent lifts of concrete being angularly displaced relative to one another. The diameter of the cables relative to the space between adjacent rows of apertures is "slightly less" than the spacing between the adjacent rows of apertures. The term "slightly less" should be taken as meaning that the cable fills the gap between lines tangential to the apertures to such an extent that concrete cannot pour freely between the cable and the apertures.

By the term "lift of concrete" is meant a layer of concrete which is allowed to solidify before the next (upwardly) layer is applied.

Whilst laying each lift of concrete the concrete can be fed via the voids between adjacent rows of apertures angularly displaced relative to the cables included in the lift, the absence of cables adjacent some parts of the periphery of the apertures providing access for consolidating tools required in the formation of the respective lift.

Figure 2:
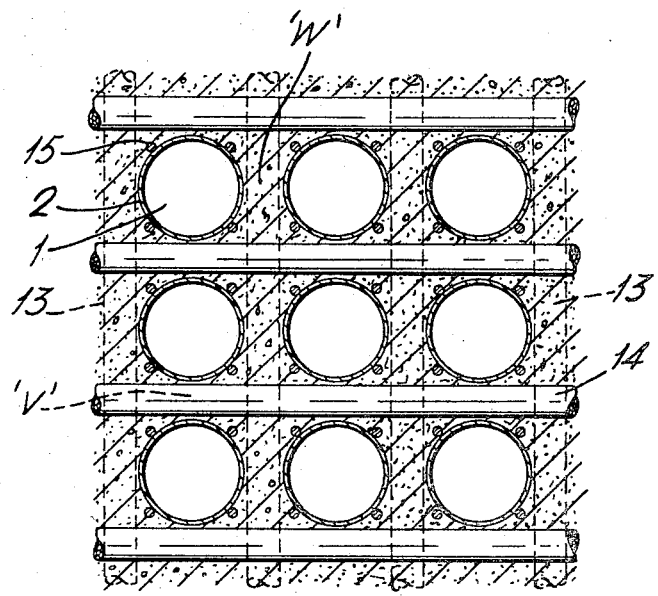
Figure 3:
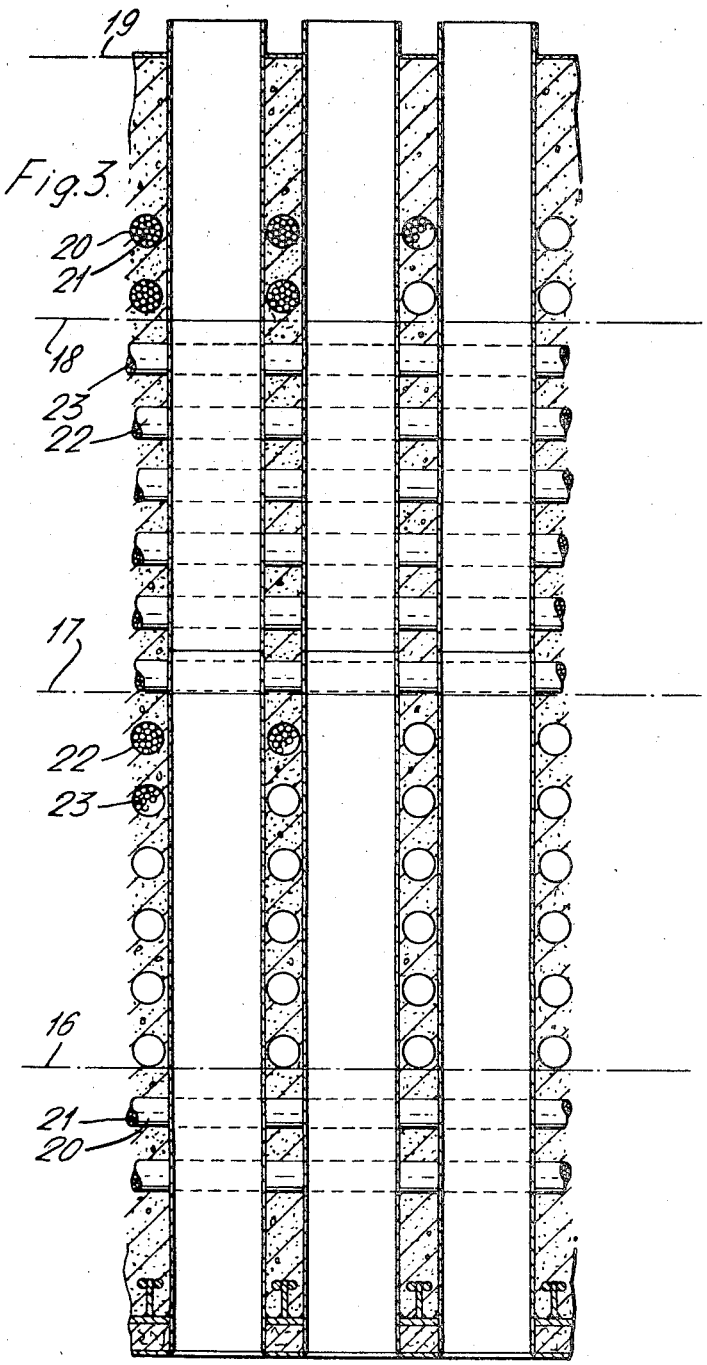
Figure 4:
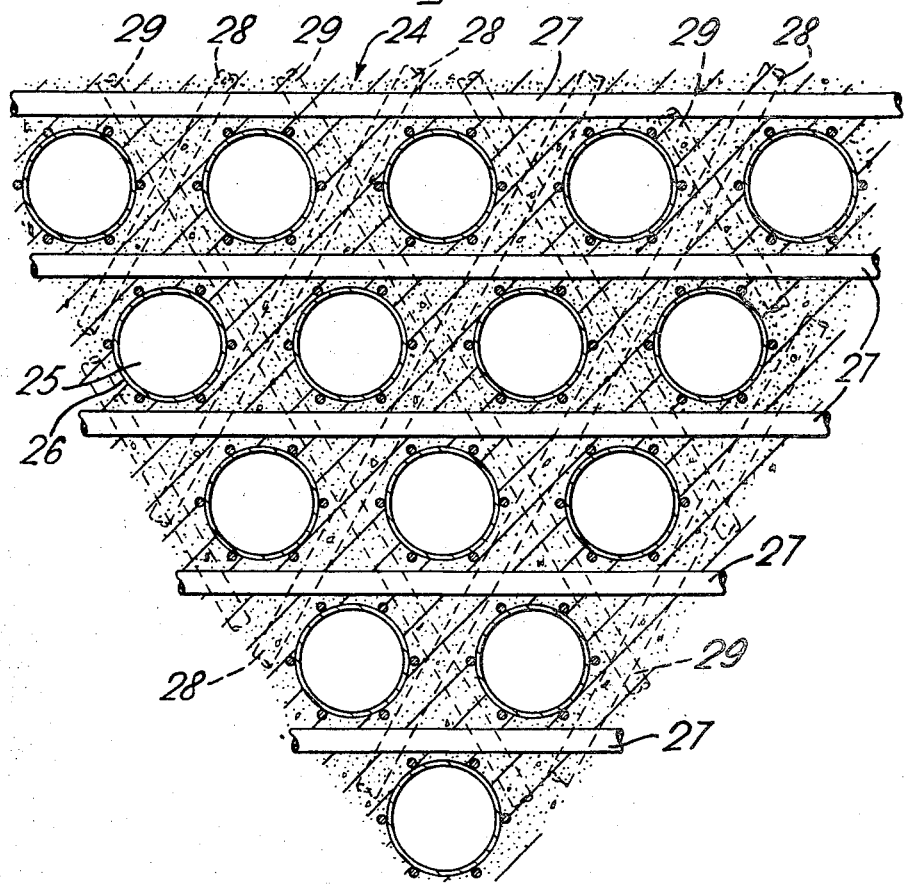

The construction of portions of concrete pressure vessels according to the invention will now be described, by way of example, with reference to the accompanying drawings wherein:

FIGURE 1 is a fragmentary side view in section of one embodiment of a concrete pressure vessel, FIGURE 2 is a fragmentary plan view in section on line II—II of FIGURE 1, FIGURE 3 is a view similar to that of FIGURE 1 and illustrating a second embodiment of concrete pressure vessel, and FIGURE 4 is a view similar to that of FIGURE 2 and illustrating a further embodiment of concrete pressure vessel.

The portion of a concrete pressure vessel shown in FIGURES 1 and 2 (the concrete pressure vessel serving for housing the core—not shown—of a gas-cooled nuclear reactor) is part spherical and has access apertures 1 having steel linings 2 which extend through the concrete from the interior of the vessel to the charge face (not shown). The apertures 1 are arrayed geometrically on a 12.8 inch square lattice pitch (which means that in plan view, lines joining the axes of adjacent apertures of any group of four adjacent apertures form a square whose sides measure 12.8 inches) to coincide with the axes of the fuel element channels of the said nuclear reactor core. The whole vessel has a steel lining 3 which has thermal insulation 4 retained by steel plates 5. The lining 3 has cooling fins 6 each of which carries two water-conducting pipes 7 for heat dissipation. The concrete for the said portion is applied to the steel lining 3 in three lifts 8, 9 and 10, lifts 9 and 10 each including a group of parallel stacks of stressing cables 11, 12 housed in conduits 13, 14 which are disposed between rows of aperture linings 2. Each stack has seven cables and the cables 12 are laid perpendicular to the cables 11. A water-conducting pipe 15 is looped to traverse the thickness of concrete four times in the vicinity of the apertures 1 to provide cooling means for the concrete. During construction, the linings 2 are fabricated from two tubes 2a, 2b, tube 2a being welded to the lining 3 and plates 5 prior to applying the lifts 8 and 9 of concrete. After applying the lift 8 of concrete the cable conduits 13 are positioned and the lift 9 of concrete applied. Access for feeding concrete and introducing a 2½ inch vibrator to consolidate the concrete around the conduits is gained via the voids designated V (FIGURE 2) between adjacent rows of linings and running perpendicular to the conduits 13. After the lift 9 is completed the tubes 2b of the linings 2 are attached to the tubes 2a, the conduits 14 positioned to run perpendicular to the conduits 13 and the lift 10 of concrete applied via the voids designated W in similar manner to that of lift 9.

The outside diameter of the linings 2 is 9¼ inches so that with a 12.8 inch lattice pitch there is just sufficient space between linings to accommodate the conduits which are 3½ inches outside diameter. The conduits are vertically spaced at 6 inch intervals and extend through a 7 foot depth of concrete. If the conduits were laid in conventional manner in the form of stacked lattices the obstruction afforded by the conduits and cooling pipes 14 would preclude the introduction of concrete and vibrator unless the lattice pitch was increased to approximately 18 inches (assuming a 2½ inch vibrator was used) which of course would introduce nuclear physics problems in addition to creating a core and pressure vessel of unacceptable proportions.

In the embodiment shown in FIGURE 3, there is illustrated a plane portion of a concrete pressure vessel, which may for example be cylindrical with axis vertical and having a flat top including the said portion. The concrete is laid in four lifts 16, 17, 18, 19. The lifts 16 and 19 include stacks of two conduits 20 housing cables 21 between aperture linings 2, and lifts 17, 18 include stacks of six conduits 22 housing cables 23. The concrete is applied in a similar manner to that of the first embodiment but after construction of the vessel and stressing of the cables, the cables 21 are bonded to the conduits 20 by injection of concrete. The bonded stressed cables and conduits additionally provide reinforcement for the concrete to minimise the formation of minute cracks under stress.

Conventional steel reinforcement may be used as an alternative to the bonding of pre-stressing cables as a means of controlling cracks in the concrete.

Embodiments wherein the access apertures are disposed on a triangular lattice pitch are also envisaged and in which the stacks of cables are included in two or more lifts of concrete, the stacks of parallel cables of one lift then being displaced relative to the direction of the cables of the succeeding stack by an angle which is less than a right angle. One typical embodiment is illustrated in FIGURE 4 which is a section through a portion of a concrete pressure vessel 24 penetrated by access apertures 25 having steel linings 26 which extend through the concrete from the interior of the vessel to the charge face of the nuclear reactor. The apertures 25 are arranged geometrically on a triangular lattice pitch of suitable dimension and their axes coincide with the axes of fuel element channels of the nuclear reactor core. In constructing the vessel, concrete is applied in three lifts or a multiple of three lifts, and groups of parallel stressing cables are applied with each lift. Those of the lift through which the reaction is taken are designated 27. Groups of stressing cables in the succeeding lifts are designated 28 and 29 respectively, and it will be seen that the groups of cables 27, 28 and 29 are arranged so that the cables of the different groups are at an angle to one another which angle is not a right angle.

I claim:

1. A pre-stressed concrete pressure vessel having a portion thereof penetrated by a plurality of closely spaced parallel apertures arranged in lattice array and providing access to the interior of the vessel, said portion comprising a plurality of lifts of concrete, each lift of concrete including substantially parallel stacks of spaced pre-stressing cables disposed between adjacent rows of apertures, the diameter of the cables in each stack being slightly less than the distance between the adjacent rows of apertures, and the said stacks associated with adjacent lifts of concrete being angularly displaced relative to one another.

2. A pre-stressed concrete pressure vessel according to claim 1, wherein the access apertures in said portion are arranged geometrically in a square lattice, and the said stacks associated with adjacent lifts of concrete are arranged at right angles to one another.

3. A pre-stressed concrete pressure vessel according to claim 1, wherein the access apertures in said portion are arranged geometrically in a triangular lattice, and the said stacks associated with adjacent lifts of concrete are arranged at other than a right angle to one another.

References Cited

UNITED STATES PATENTS

| 2,702,424 | 2/1955 | Bakker | 52—723 X |
| 2,777,295 | 1/1957 | Bliss et al. | 52—192 X |
| 3,151,416 | 10/1964 | Eakin et al. | 264—35 X |

FOREIGN PATENTS

| 1,306,797 | 10/1962 | France. |
| 861,513 | 2/1961 | Great Britain. |
| 897,351 | 5/1962 | Great Britain. |
| 898,052 | 5/1962 | Great Britain. |

FRANK L. ABBOTT, *Primary Examiner.*

P. C. FAW, *Assistant Examiner.*